(12) United States Patent
Sheffield et al.

(10) Patent No.: US 9,344,295 B2
(45) Date of Patent: May 17, 2016

(54) WIRELINE COMMUNICATION SYSTEM AND METHOD EMPLOYING A MILITARY STANDARD 1553 BUS

(71) Applicant: The Boeing Company, Chicago, IL (US)

(72) Inventors: Gregory L. Sheffield, O'Fallon, MO (US); Robert G. Becnel, Imperial, MO (US)

(73) Assignee: The Boeing Company, Chicago, IL (US)

( * ) Notice: Subject to any disclaimer, the term of this patent is extended or adjusted under 35 U.S.C. 154(b) by 20 days.

(21) Appl. No.: 14/218,230

(22) Filed: Mar. 18, 2014

(65) Prior Publication Data

US 2015/0270985 A1     Sep. 24, 2015

(51) Int. Cl.
*H04B 1/38*     (2015.01)
*H04L 12/40*    (2006.01)
*H04B 3/50*     (2006.01)
*H04L 5/00*     (2006.01)

(52) U.S. Cl.
CPC ........ *H04L 12/40* (2013.01); *H04B 3/50* (2013.01); *H04L 5/006* (2013.01); *H04L 2012/4028* (2013.01)

(58) Field of Classification Search
CPC . H04L 12/40; H04L 5/006; H04L 2012/4028; H04B 3/50
USPC ........................................................ 375/220
See application file for complete search history.

(56) References Cited

U.S. PATENT DOCUMENTS 7,920,588 B2 * 4/2011 Fanson ..................... 370/451

OTHER PUBLICATIONS

MIL-STD-1553—wikipedia, the free encyclopedia [online] [retrieved Jan. 28, 2014]. Retrieved from the Internet: <URL: http://en.wikipedia.org/wiki/MIL-STD-1553>. (undated) 13 pages.
AIT MIL-STD-1553 Protocol Tutorial (undated) pp. 3-64.
Twinax vs. Triax Cables: Benefits and Differences | Milestek-Blog [online] [retrieved Jan. 28, 2014]. Retrieved from the Internet: <URL: http://www.milestek.com/blog/index.php/2011/05/twinax-vs-triax-cables-benefits-and-diff . . . >. (dated May 3, 2011) 4 pages.

* cited by examiner

*Primary Examiner* — David S Huang
(74) *Attorney, Agent, or Firm* — Alston & Bird LLP (57) ABSTRACT

A wireline communication system and method are provided that utilize a military standard 1553 bus to transmit both military standard 1553 communication signals and other communication signals, such as those transmitted in accordance with another communications protocol. A wireline communication system may include a military standard 1553 bus and a military standard 1553 node configured to communicate with military standard 1553 communication signals at a first predefined range of frequencies. The wireline communication system further includes a first interface node configured to communicate via the military standard 1553 bus with second communication signals having a second predefined range of frequencies, different than the first predefined range of frequencies. The second communication signals are transmitted along the military standard 1553 bus at less than a predetermined decibel level. The second predefined range of frequencies and the predetermined decibel level are selected to limit interference between the different signals.

17 Claims, 4 Drawing Sheets

WIRELINE COMMUNICATION SYSTEM AND METHOD EMPLOYING A MILITARY STANDARD 1553 BUS

TECHNOLOGICAL FIELD

An example embodiment of the present disclosure relates generally to wireline communication systems and methods and, more particularly, to wireline communication systems and methods employing a military standard 1553 bus.

BACKGROUND

A military standard 1553 bus was initially designed to support military avionics, but has become used for various onboard data handling subsystems on a variety of aircraft and spacecraft, both military and commercial. A military standard 1553 bus conforms to the MIL-STD-1553B specification which was originally published in 1978 and is now entitled "Digital Time Division Command/Response Multiplex Data Bus". A military standard 1553 bus includes a dual redundant balanced line physical layer, employs time division multiplexing and supports a half-duplex command/response protocol. A plurality of remote terminals or devices, such as up to 31 remote terminals or devices, may be communicably connected to a military standard 1553 bus so as to communicate thereover.

Not only has the use of military standard 1553 buses proliferated onboard aircraft and other platforms, but the same aircraft and other platforms also generally include a number of other buses for supporting communication between devices in accordance with other communication protocols. By utilizing separate buses for the different communication protocols, communication signals transmitted via each of the buses may be relatively independent so as not to interfere with the communication signals transmitted via the other buses in accordance with a different communication protocol. However, the increase in the number of buses and the demand for even further increases in the number of buses correspondingly cause the number of cables and wires required for the additional buses to increase which may disadvantageously increase the weight onboard an aircraft, increase the cost associated with the communication buses onboard an aircraft, increase the power consumed by the communications buses and increase the cost and time required to install and integrate the communication buses and the plurality of devices that communicate thereover.

BRIEF SUMMARY

A wireline communication system and method are provided in accordance with an example embodiment that utilizes a military standard 1553 bus in order to transmit both military standard 1553 communication signals as well as other communication signals, such as communication signals transmitted in accordance with another communications protocol. By supporting the transmission of communication signals in accordance with both the military standard 1553 communication protocol and another communication protocol, the military standard 1553 bus may be leveraged in order to reduce the number of communication buses and, therefore, the number of cables and wires, onboard an aircraft or other platform or at least slow the rate at which the number of communication buses are added to an aircraft or other platform. Consequently, the weight attributable to the communication buses, the power consumed by operation of the communication buses and the labor time and integration costs associated with the communication buses may be correspondingly reduced.

In one embodiment, a wireline communication system is provided that includes a military standard 1553 bus comprising at least two conductors. The wireline communication system also includes a military standard 1553 node configured to communicate via the military standard 1553 bus with military standard 1553 communication signals at a first predefined range of frequencies. The wireline communication system of this embodiment also includes a first interface node configured to communicate via the military standard 1553 bus with second communication signals having a second predefined range of frequencies, different than the first predefined range of frequencies. The second communication signals are transmitted along the military standard 1553 bus at less than a predetermined decibel level. The second predefined range of frequencies and the predetermined decibel level are selected such that the military standard 1553 communication signals continue to satisfy a predetermined minimum signal to noise ratio while the second communication signals are transmitted.

The wireline communication system of an example embodiment may also include a second interface node configured to communicate with the first interface node via the military standard 1553 bus. The first and second interface nodes comprise a first pair of interface nodes. The wireline communication system of this example embodiment may also include a second pair of interface nodes. The second pair of interface nodes includes third and fourth interface nodes configured to communicate via the military standard 1553 bus with third communication signals having a third predefined range of frequencies, different than the first predefined range of frequencies. The third communication signals are transmitted along the military standard 1553 bus at less than a predetermined decibel level. The third predefined range of frequencies and the predetermined decibel level are selected such that the military standard 1553 communication signals continue to satisfy the predetermined minimum signal to noise ratio while the third communication signals are transmitted.

The wireline communication system of an example embodiment may also include a first transformer coupler between the military standard 1553 node and the military standard 1553 bus. The wireline communication system of this example embodiment may also include a second transformer coupler between the first interface node and the military standard 1553 bus. In one embodiment, the military standard 1553 communication signals are transmitted in accordance with a military standard 1553 communication protocol and the second communication signals are transmitted in accordance with a predefined communication protocol, different than the military standard 1553 communication protocol. In one embodiment in which the first predefined range of frequencies of the military standard 1553 communication signals is centered about 1 MHz, the second predefined range of frequencies of the second communication signals may be 2 MHz to 45 MHz, 200 MHz to 400 MHz or 2 GHz to 4 GHz.

In another embodiment, an assembly is provided that includes an aircraft and a military standard 1553 bus including at least two conductors extending through at least a portion of the aircraft. The assembly of this embodiment also includes a military standard 1553 node carried by the aircraft and configured to communicate via the military standard 1553 bus with military standard 1553 communication signals of the first predefined range of frequencies. The assembly of this embodiment also includes a first pair of interface nodes carried by the aircraft and configured to communicate via the military standard 1553 bus with second communication signals having a second predefined range of frequencies, different than the first predefined range of frequencies. The second communication signals are transmitted along the military standard 1553 bus at less than a predetermined decibel level. The second predefined range of frequencies and the predetermined decibel level are selected such that the military standard 1553 communication signals continue to satisfy a predetermined minimum signal to noise ratio while the second communication signals are transmitted.

The assembly of an example embodiment may also include a second pair of interface nodes carried by the aircraft. The second pair of interface nodes includes third and fourth interface nodes configured to communicate via the military standard 1553 bus with a third communication signals having a third predefined range of frequencies, different than the first predefined range of frequencies. The third communication signals are transmitted along the military standard 1553 bus at less than the predetermined decibel level. The third predefined range of frequencies and the predetermined decibel level are selected such that the military standard 1553 communication signals continue to satisfy a predetermined minimal signal while the third communication signals are transmitted.

The military standard 1553 communication signals may be transmitted in accordance with a military standard 1553 communication protocol. In this embodiment, the second communication signals may be transmitted in accordance with a predefined communication protocol, different than the military standard 1553 communication protocol. In one embodiment in which the first predefined range of frequencies of the military standard 1553 communication signals is centered about 1 MHz, the second predefined range of frequencies of the second communication signals may be 2 MHz to 45 MHz, 200 MHz to 400 MHz or 2 GHz to 4 GHz.

In a further embodiment, a communications method is provided that includes providing a military standard 1553 bus that includes at least two conductors. The communications method of this embodiment also includes communicating via the military standard 1553 bus with military standard 1553 communication signals at a first predefined range of frequencies. The communications method of this embodiment also includes communicating via the military standard 1553 bus with the second communication signals having a second predefined range of frequencies, different than the first predefined range of frequencies. The second communication signals are transmitted along the military standard 1553 bus at less than a predetermined decibel level. The second predefined range of frequencies and the predetermined decibel level are selected such that the military standard 1553 communication signals continue to satisfy a predetermined minimum signal to noise ratio while the second communication signals are transmitted.

The method of an example embodiment may also include communicating via the military standard 1553 bus with third communication signals having a third predefined range of frequencies, different than the first predefined range of frequencies. In this embodiment, the third communication signals are transmitted along the military standard 1553 bus at less than the predetermined decibel level. The third predefined range of frequencies and the predetermined decibel level are selected such that the military standard 1553 communication signals continue to satisfy a predetermined minimum signal to noise ratio while the third communication signals are transmitted.

The method of an example embodiment may communicate via the military standard 1553 bus with military standard 1553 communication signals by communicating in accordance with a military standard 1553 communication protocol. In this embodiment, the method may also communicate via the military standard 1553 bus with the second communication signals by communicating in accordance with a predefined communication protocol, different than the military standard 1553 communication protocol. In an embodiment in which the first predefined range of frequencies of the military standard 1553 communication signals is 1 MHz, the second predefined range of frequencies of the second communication signals may be 2 MHz to 45 MHz, 200 MHz to 400 MHz or 2 GHz to 4 GHz.

BRIEF DESCRIPTION OF THE DRAWINGS

Having thus described aspects of the present disclosure in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Figure 1:
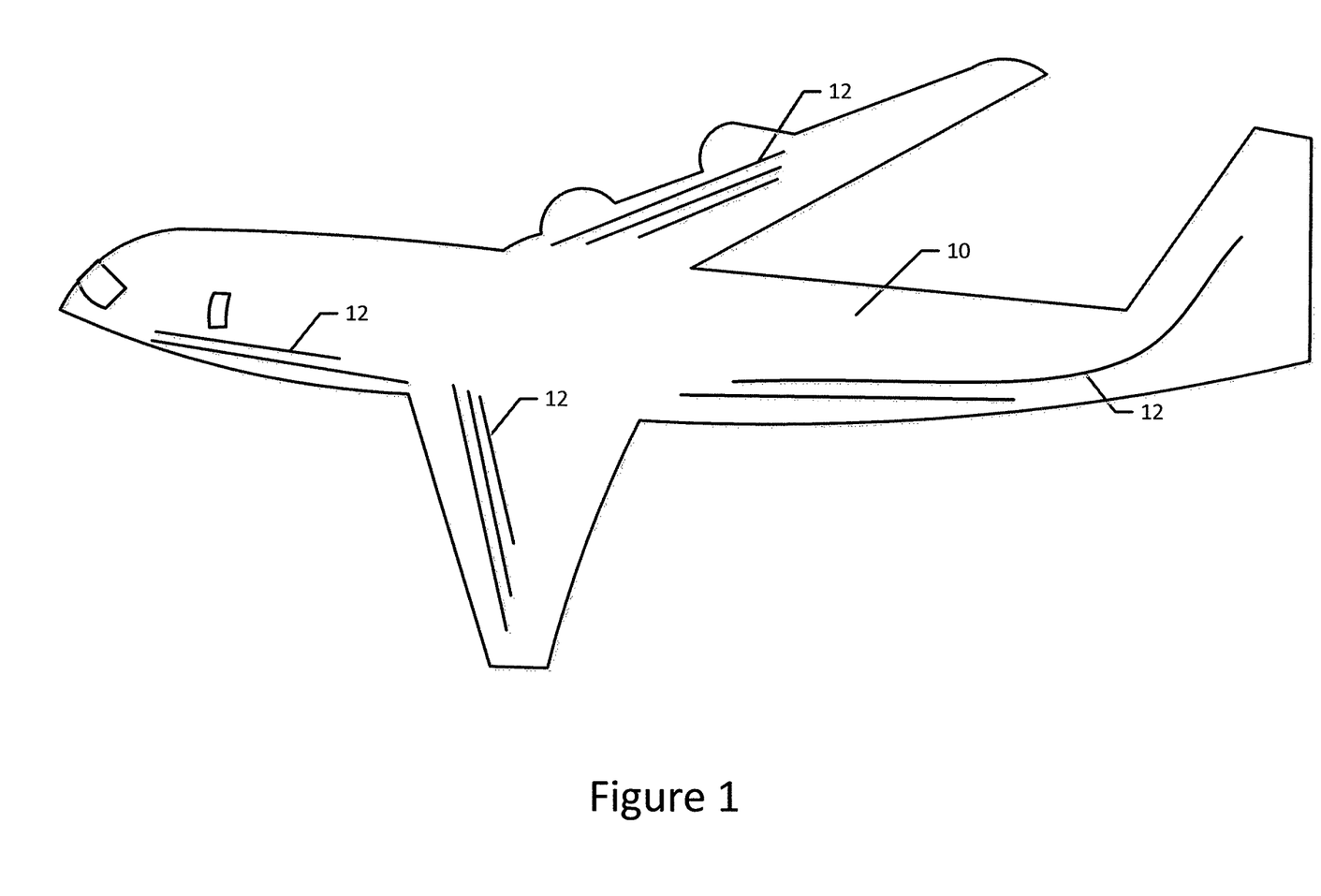
FIG. 1 is a perspective view of an aircraft having a plurality of military standard 1553 buses.

A wireline communication system and method are provided in accordance with an example embodiment in order to provide for the transmission of various types of communication signals via a military standard 1553 bus. The military standard 1553 bus may be carried by a variety of platforms and, in one embodiment, may be carried by an aircraft 10 as shown in FIG. 1. In this regard, an aircraft is shown that includes a plurality of military standard 1553 buses 12 extending through different portions of the aircraft for supporting transmission of various military standard 1553 communication signals for various purposes.

A military standard 1553 communication bus 12 is a communication bus constructed and operated in accordance with MIL-STD-1553B, a military standard originally published by the U.S. Department of Defense in 1978 and now entitled "Digital Time Division Command/Response Multiplex Data Bus". The MIL-STD-1553B specification defines the mechanical, electrical and functional characteristics of the serial data bus. A military standard 1553 bus includes a dual redundant balanced line physical layer. The military standard 1553 bus includes at least two conductors. In one embodiment, a military standard 1553 bus comprises a triaxial ("triax") cable having three conductors. A triax cable has a coaxial cable construction with a center conductor and an inner shield surrounding the center conductor and separated from the center conductor by insulation. A triax cable also includes an additional outer shield, such as an outer copper braid, that surrounds the inner shield and is separated from the inner shield by insulation.

Figure 2:
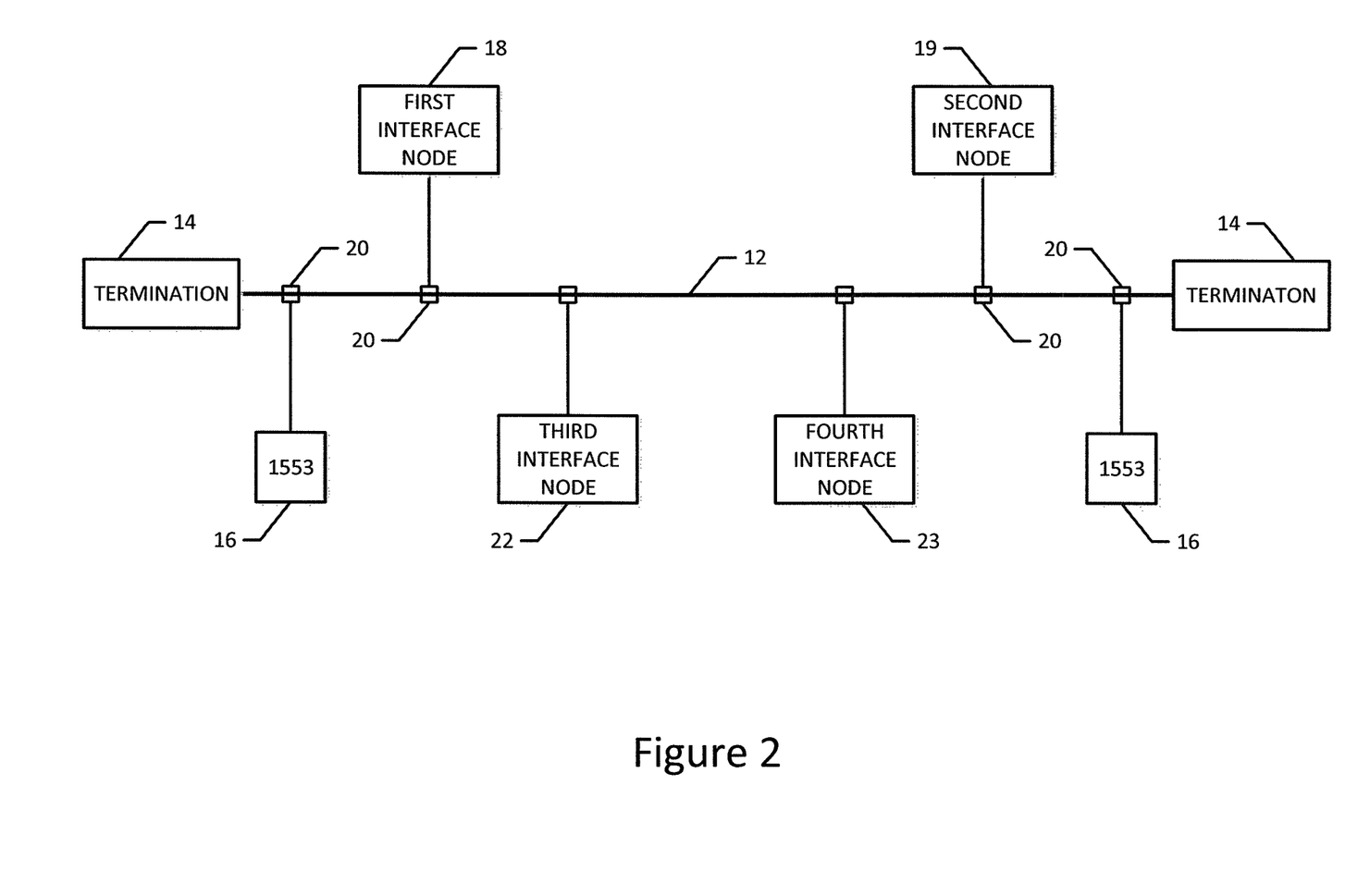
FIG. 2 is a schematic representation of a wireline communication system in accordance with an example embodiment of the present disclosure.

As shown in FIG. 2, a military standard 1553 bus 12 may extend between terminations 14. The terminations may terminate the military standard 1553 bus with a resistance equal to the nominal characteristic impedance, such as about 78 ohms, of the military standard 1553 bus so as to minimize the effects of signal reflections that may otherwise cause waveform distortion. As also shown in FIG. 2, a wireline communication system including a military standard 1553 bus may include a military standard 1553 node 16 configured to communicate via the military standard 1553 bus with military standard 1553 communication signals at a first predefined range of frequencies. Indeed, the wireline communication system may include a plurality of military standard 1553 nodes, such as a pair of military standard 1553 nodes that are spaced apart along the military standard 1553 bus and are each configured to communicate via the military standard 1553 bus with military standard 1553 communication signals. Although a pair of military standard 1553 nodes is illustrated in FIG. 2, the wireline communication system may include a plurality of pairs of military standard 1553 nodes in other embodiments.

A military standard 1553 node 16 may be a remote terminal that provides, for example, an interface between the military standard 1553 bus 12 and another subsystem and/or that serves as a bridge between the military standard 1553 bus and another military standard 1553 bus. By way of example, one military standard 1553 node may receive data from an inertial navigation subsystem and may transmit the data from the inertial navigation subsystem over the military standard 1553 bus to another military standard 1553 node that serves as an interface for a display subsystem such that the data from the inertial navigation subsystem may be displayed.

The wireline communication system may also include a first transformer coupler 20 and, more typically, a plurality of first transformer couplers, one of which is associated with each military standard 1553 node 16. In this regard, a first transformer coupler may be embodied by a coupling transformer and associated isolation resisters that serve to communicably couple a respective military standard 1553 node to the military standard 1553 bus 12. While the military standard 1553 node may be directly connected to the first transformer coupler and, in turn, to the military standard 1553 bus, the military standard 1553 node may communicably connected to a stub, that is, a relatively short length of cable of the same type as the military standard 1553 bus, so as to connect the military standard 1553 node and the first transformer coupler while permitting the military standard 1553 node to be spaced apart therefrom.

Figure 3:
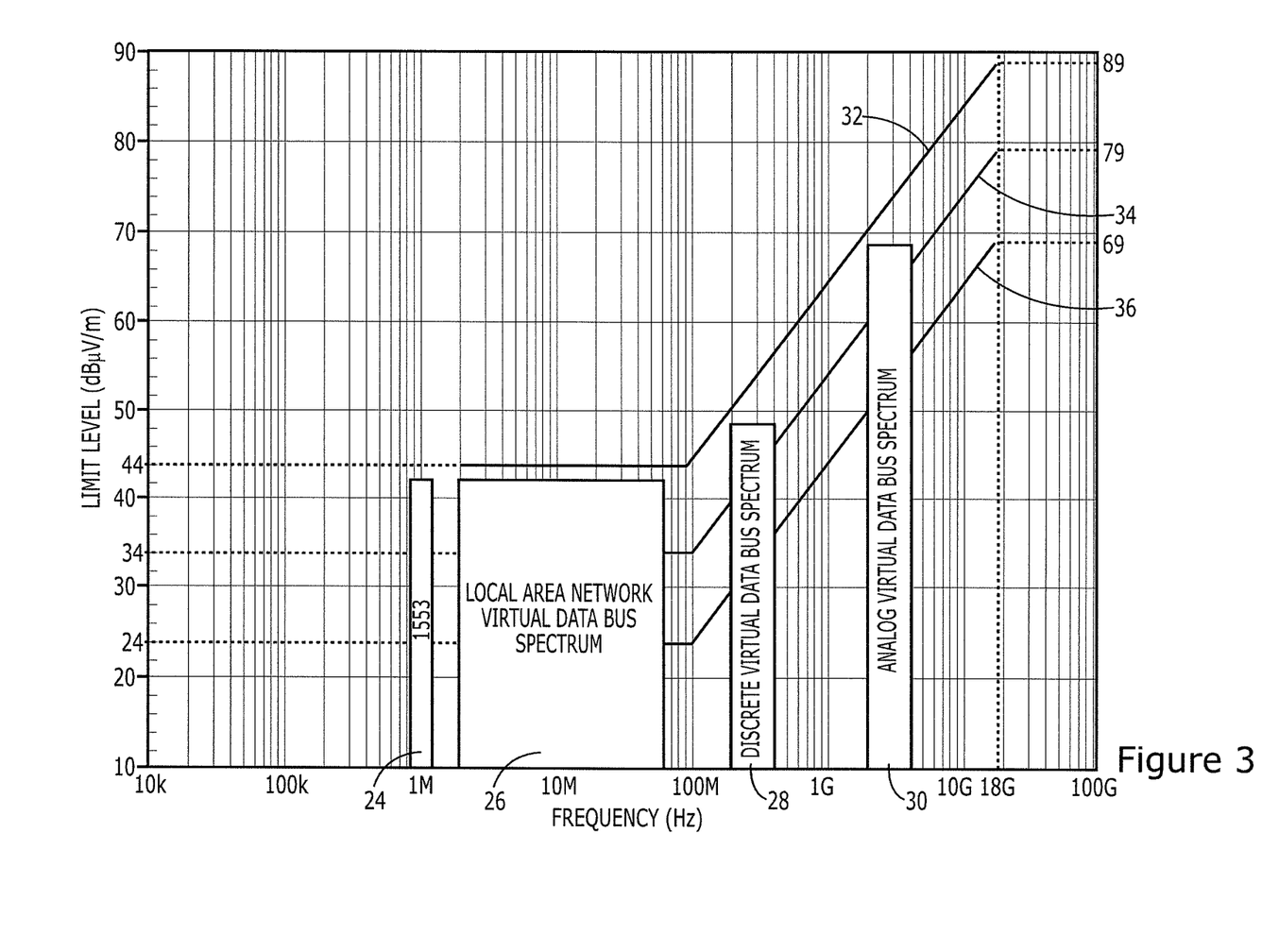
FIG. 3 is a graphical representation of the first range of frequencies at which military standard 1553 communication signals are transmitted as well as other predefined ranges of frequencies at which other communication signals maybe transmitted at a decibel level that continues to satisfy a predetermined minimum signal to noise ratio of the military standard 1553 communication signals in accordance with an example embodiment of the present disclosure.

As noted above, the military standard 1553 communication signals may be transmitted at a first predefined range of frequencies, which may be centered about 1 MHz as shown at 24 in FIG. 3. In addition, the military standard 1553 communication signals may be transmitted in accordance with a military standard 1553 communication protocol, such as a half-duplex command/response protocol utilizing, for example, time division multiplexing.

As shown in FIG. 2, the wireline communication system may also include a first interface node 18 configured to communicate via the military standard 1553 bus 12 with second communication signals having a second predefined range of frequencies, different than the first predefined range of frequencies. In this regard, the first interface node may also be configured to transmit the second communication signals in accordance with a predefined communication protocol, different than the military standard 1553 communication protocol. For example, the first interface node may be configured to transmit second communication signals in accordance with a local area network protocol.

In the embodiment depicted in FIG. 2, the wireline communication system also includes a second interface node 19 configured to communicate with the first interface node 18 via the military standard 1553 bus 12 such that the first and second interface nodes form a first pair of interface nodes. As shown in FIG. 2, the first and second interface nodes may be spaced apart along the length of the military standard 1553 bus so as to communicate therealong utilizing the second communication signals. Although a single pair of interface nodes is depicted in the embodiment of FIG. 2, the wireline communication system may include a plurality of pairs of interface nodes spaced apart along and communicably connected to the military standard 1553 bus. The first and second interface nodes may be embodied by a device or system that are configured to transmit and receive the second communication signals. Additionally or alternatively, the first and second interface nodes may serve as an interface to another subsystem and/or as an interface to another communication bus, such as a communication bus configured to communicate in accordance with the predefined communication protocol that differs from the military standard 1553 communication protocol.

Additionally, the wireline communication system may include a second transformer coupler 20 and, more typically, a plurality of second transformer couplers, one of which is positioned between and in communication with a respective interface node 18, 19 and a military standard 1553 bus 12. As described above in conjunction with the first transformer coupler, the second transformer coupler may be embodied by a transformer and one or more isolation resistors so as to communicably couple the respective interface node with the military standard 1553 bus. In addition, the interface nodes may be directly connected via the second transformer coupler to the military standard 1553 bus or may be spaced apart therefrom with a stub, such as a cable which may be of the same type of cable as that which forms the military standard 1553 bus.

In addition to having a different frequency than the first predefined range of frequencies of the military standard 1553 communication signals, the second communication signals are transmitted along the military standard 1553 bus 12 at less than a predetermined decibel level. In this regard, the second predefined range of frequencies and the predetermined decibel level are selected such that the second communication signals do not cause an unacceptable level of interference with the military standard 1553 communication signals transmitted along the same military standard 1553 bus. In this regard, the second predefined range of frequencies and the predetermined decibel level are selected such that the second communication signals do not cause a predetermined minimum signal to noise ratio of the military standard 1553 communication signals to be violated. In other words, the military standard 1553 communication signals may continue to satisfy the predetermined minimum signal to noise ratio while the second communication signals are being transmitted, such as concurrently with the military standard 1553 communication signals. As such, the military standard 1553 bus can carry both the military standard 1553 communication signals and the second communication signals without meaningful interference therebetween.

The predefined decibel level at which the second communication signals may be transmitted via the military standard 1553 bus 12 without violating the predetermined minimum signal to noise ratio depends upon the platform, such as the type of aircraft, which carries the wireline communication system as well as the second predefined range of frequencies of the second communication signals. As shown by line 32 in FIG. 3, for example, the predefined decibel level below which the second communication signals must be transmitted along a military standard 1553 bus carried by a fixed wing aircraft that is at least 25 meters from nose to tail is 44 dBµV/m for frequencies up to 100 MHz and then increases linearly for frequencies up to 18 GHz, after which the predefined decibel level is fixed at 89 dBµV/m. Although line 32 in FIG. 3 illustrates the predetermined decibel level for second communication signals having various predefined ranges of frequencies for a fixed wing aircraft having a length of at least 25 meters from nose to tail, other platforms, such as other types of aircraft and/or other sizes of aircraft, may cause other predetermined decibel levels, such as lower decibel levels, to be defined for the second communication signals in order to permit the predetermined minimum signal to noise ratio of the military standard 1553 communication signals to be satisfied. By way of example, the predefined decibel level below which the second communication signals must be transmitted along a military standard 1553 bus carried by a fixed wing aircraft that is less than 25 meters nose to tail is shown by line 34 and the predefined decibel level below which the second communication signals must be transmitted along a military standard 1553 bus carried by helicopters and external fixed wing aircraft (in the frequency range of 2 MHz to 18 GHz) is shown by line 36.

As also shown in FIG. 3, the second communication signals may be transmitted at various second predefined ranges of frequencies depending upon the type of signals, e.g., local area network signals, discrete signals or analog signals, with the predefined decibel level depending upon the second predefined range of frequencies. In this regard, the various types of signals, e.g., local area network signals, discrete signals or analog signals, that may be transmitted as second communications signals via a military standard 1553 bus, e.g., a triax cable, were previously transmitted via separate buses, such as a quad cable for local area network signals. One or more of these different types of signals, e.g., local area network signals, discrete signals or analog signals, may now be carried by a military standard 1553 bus, albeit at different frequencies, such that the military standard 1553 bus serves as a virtual data bus for the different types of signals.

For example, in an instance in which the first predefined range of frequencies of the military standard 1553 communication signals is centered about 1 MHz as shown at 24, the second predefined range of frequencies may be from 2 MHz to 45 MHz as shown at 26, such as for a local area network signals, and the predetermined decibel level may be selected to be less than 44 dBµV/m for a fixed wing aircraft that is at least 25 meters from nose to tail (as represented by line 32) such that the second communication signals do not cause the predetermined minimum signal to noise ratio of the military standard 1553 communication signals to be violated. In embodiments in which the military standard 1553 bus also or alternatively carries discrete signals, the second predefined range of frequencies of the second communication signals may be spaced further from the first predefined range of frequencies of the military standard 1553 communication signals and the predetermined decibel level of the second communication signals may be increased while still insuring that the predetermined minimum signal to noise ratio of the military standard 1553 communication signals is satisfied. For example, in an instance in which the first predefined range of frequencies of the military standard 1553 communication signals is centered about 1 MHz, the second predefined range of frequencies may be from 200 MHz to 400 MHz as shown at 28, such as for discrete signals, and the predetermined decibel level may be selected to be less than 50 dBµV/m for a fixed wing aircraft that is at least 25 meters from nose to tail (as represented by line 32) such that the second communication signals do not cause the predetermined minimum signal to noise ratio of the military standard 1553 communication signals to be violated. In embodiments in which the military standard 1553 bus also or alternatively carries analog signals and in an instance in which the first predefined range of frequencies of the military standard 1553 communication signals is centered 1 MHz, the second predefined range of frequencies may be from 2 GHz to 4 GHz as shown at 30, such as for analog signals, and the predetermined decibel level may be selected to be less than 70 dBµV/m for a fixed wing aircraft that is at least 25 meters from nose to tail (as represented by line 32) such that the second communication signals do not cause the predetermined minimum signal to noise ratio of the military standard 1553 communication signals to be violated. The second predefined range of frequencies is advantageously spaced apart from the first predefined range of frequencies, such as by at least 1 MHz in one embodiment.

By permitting second communication signals transmitted at a different frequency and in accordance with a different communication protocol than the military standard 1553 communication signals to be transmitted upon the same military standard 1553 bus 12 as the military standard 1553 communication signals, the military standard 1553 bus that may be required on board at least some platforms, such as at least some aircraft 10, for the transmission of certain types of data may be leveraged in order to support the transmission of other types of communication signals. Thus, the number of communication buses onboard the platform may be reduced or further increases in the number of communication buses onboard the platform may be reduced, thereby reducing the number of cables and wires and correspondingly the weight attributable to the additional communication buses. Moreover, the use of a military standard 1553 bus for supporting transmission of additional types of communication signals may also reduce the power consumed by the communication buses and the costs and labor required to install, integrate and maintain the communication buses. However, by configuring the wireline communication system in terms of the frequency and the maximum decibel level of the second communication signals, the different types of communication signals supported by the military standard 1553 bus may not undesirably interfere with one another such that the different types of communication signals may operate independently of one another via the same military standard 1553 bus.

The wireline communication system is not limited to transmitting only one type of communication signal in addition to the military standard 1553 communication signals. Instead, the military standard 1553 bus may support the concurrent transmission of a plurality of different types of communication signals so long as the frequency and the decibel level of the communication signals are selected so as not to cause undesirable interference with the military standard 1553 communication signals and, typically, with the other communication signals. For example, in one embodiment, the wireline communication system may include one or more additional pairs of interface nodes configured to communicate via the military standard 1553 bus 12 with third communication signals having a third predefined range of frequencies, different than the first predefined range of frequencies and different than the second predefined range of frequencies. In this regard, the third communication signals may be transmitted in accordance with a predefined communication protocol that is different than the communication protocol of the second communication signals and the military standard 1553 communication protocol. In this embodiment, however, the third communication signals may be transmitted, such as between the third and fourth interface nodes 22, 23 of a second pair of interface nodes as shown in FIG. 2, along the military standard 1553 bus at a frequency within a third predefined range of frequencies and at less than a predetermined decibel level with the third predefined range of frequencies and the predetermined decibel level being selected such that the third communication signals do not cause the predetermined minimum signal to noise ratio of the military standard 1553 communication signals to be violated. In other words, the military standard 1553 communication signals may continue to satisfy the predetermined minimum signal to noise ratio while the third communication signals are being transmitted, such as concurrently with the military standard 1553 communication signals.

Figure 4:
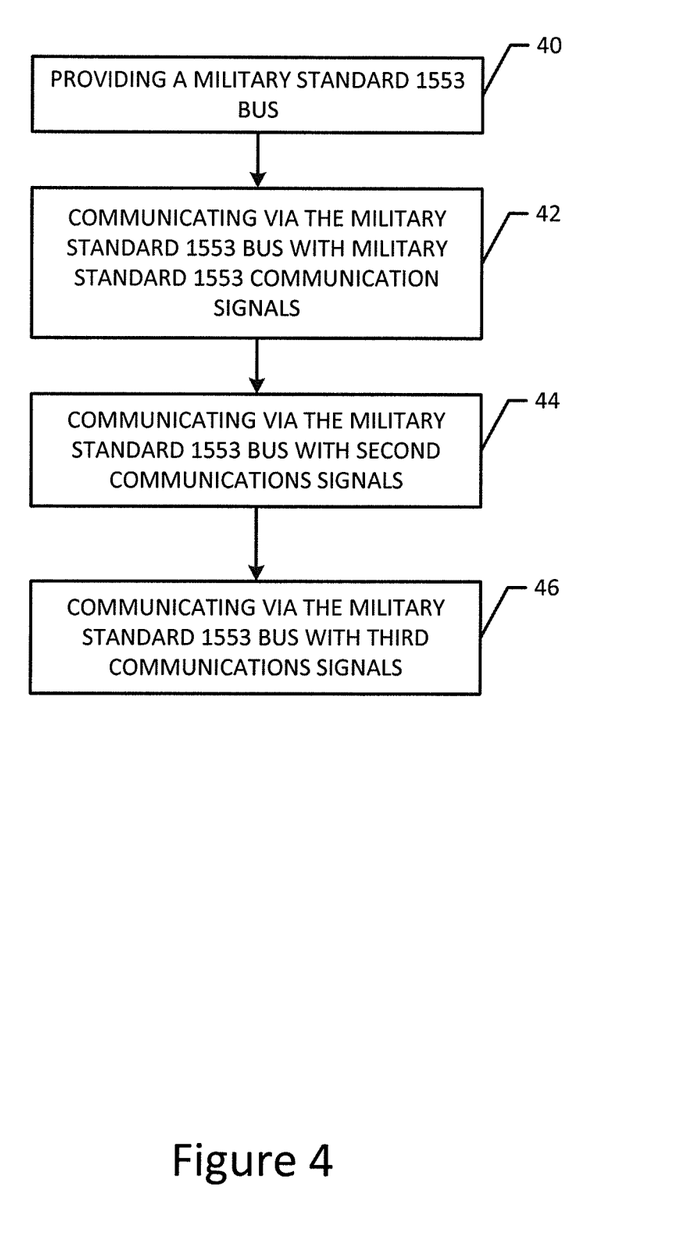
FIG. 4 is a flowchart illustrating operations performed in accordance with an example embodiment of the present disclosure.

Referring now to FIG. 4, the operations performed in accordance with the method of an example embodiment are depicted. As shown, a military standard 1553 bus 12 is provided that includes at least two conductors. See block 40. As shown in block 42, the method includes communicating via the military standard 1553 bus with the military standard 1553 communication signals of the first predefined range of frequencies and, in one embodiment, in accordance with a military standard 1553 communication protocol. As shown in block 44, the method also includes communicating via the military standard 1553 bus with second communication signals, e.g., local area network signals, having a second predefined range of frequencies, different than the first predefined range of frequencies, and, in one embodiment, in accordance with a predefined communication protocol, different than the military standard 1553 communication protocol. As described above, the second communication signals are transmitted along the military standard 1553 bus at less than a predetermined decibel level. In this regard, the second predefined range of frequencies and the predetermined decibel level are selected such that the second communication signals do not cause a predetermined minimum signal to noise ratio of the military standard 1553 communication signals to be violated. In this regard, the military standard 1553 communication signals may continue to satisfy the predetermined minimum signal to noise ratio while the second communication signals are being transmitted. As such, the second communication signals will not undesirably interfere with the military standard 1553 communication signals even though they are all transmitted via the same military standard 1553 bus.

As shown in block 46, of FIG. 4, the method of an example embodiment may also optionally include communicating via the military standard 1553 bus 12 with one or more additional types of communication signals, such as third communication signals, e.g., discrete signals and/or analog signals, having a third predefined range of frequencies, different than the first predefined range of frequencies and, in some embodiments, also different than the second predefined range of frequencies. In this regard, the third communication signals may be transmitted in accordance with a communication protocol that is different not only from the military standard 1553 communication protocol, but also from the communication protocol of the second communication signals. Thus, the military standard 1553 bus of this embodiment may support the concurrent transmission of additional types of signals in accordance with different communication protocols. The third communication signals may be transmitted along the military standard 1553 bus at less than the predetermined decibel level. Further, the third predefined range of frequencies and the predetermined decibel level of the third communication signals may be selected such that the third communication signals do not cause the predetermined minimum signal to noise ratio of the military standard 1553 communication signals to be violated. The military standard 1553 communication signals may therefore continue to satisfy the predetermined minimum signal to noise ratio while the third communication signals are being transmitted. Consequently, the military standard 1553 bus may be further leveraged to support a transmission of a plurality of different types of communication signals.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A wireline communication system comprising:
   a military standard 1553 bus comprising at least two conductors;
   a military standard 1553 node configured to communicate via the military standard 1553 bus with military standard 1553 communication signals at a first predefined range of frequencies;
   a first interface node configured to communicate via the military standard 1553 bus with second communication signals having a second predefined range of frequencies, different than the first predefined range of frequencies, wherein the second communication signals are transmitted along the military standard 1553 bus at less than a predetermined decibel level, and wherein the second predefined range of frequencies and the predetermined decibel level are selected such that the military standard 1553 communication signals continue to satisfy a predetermined minimum signal to noise ratio while the second communication signals are transmitted; and
   a pair of interface nodes configured to communicate via the military standard 1553 bus with third communication signals having a third predefined range of frequencies, different than both the first predefined range of frequencies and the second predefined range of frequencies, wherein the third communication signals are transmitted along the military standard 1553 bus at less than the predetermined decibel level, and wherein the third predefined range of frequencies and the predetermined decibel level are selected such that the military standard 1553 communication signals continue to satisfy the predetermined minimum signal to noise ratio while the third communication signals are transmitted.

2. The wireline communication system of claim 1 further comprising a second interface node configured to communicate with the first interface node via the military standard 1553 bus, wherein the first and second interface nodes comprise a first pair of interface nodes.

3. The wireline communication system of claim 1 further comprising:
   a first transformer coupler between the military standard 1553 node and the military standard 1553 bus; and
   a second transformer coupler between the first interface node and the military standard 1553 bus.

4. The wireline communication system of claim 1 wherein the military standard 1553 communication signals are transmitted in accordance with a military standard 1553 communication protocol, and wherein the second communication signals are transmitted in accordance with a predefined communication protocol, different than the military standard 1553 communication protocol.

5. The wireline communication system of claim 1 wherein the first predefined range of frequencies is centered about 1 MHz, and wherein the second predefined range of frequencies comprises 2 MHz to 45 MHz.

6. A wireline communication system comprising:
   a military standard 1553 bus comprising at least two conductors;
   a military standard 1553 node configured to communicate via the military standard 1553 bus with military standard 1553 communication signals at a first predefined range of frequencies; and
   a first interface node configured to communicate via the military standard 1553 bus with second communication signals having a second predefined range of frequencies, different than the first predefined range of frequencies, wherein the second communication signals are transmitted along the military standard 1553 bus at less than a predetermined decibel level, and wherein the second predefined range of frequencies and the predetermined decibel level are selected such that the military standard 1553 communication signals continue to satisfy a predetermined minimum signal to noise ratio while the second communication signals are transmitted,
   wherein the first predefined range of frequencies is centered about 1 MHz, and wherein the second predefined range of frequencies comprises 200 MHz to 400 MHz.

7. A wireline communication system comprising:
   a military standard 1553 bus comprising at least two conductors;
   a military standard 1553 node configured to communicate via the military standard 1553 bus with military standard 1553 communication signals at a first predefined range of frequencies; and
   a first interface node configured to communicate via the military standard 1553 bus with second communication signals having a second predefined range of frequencies, different than the first predefined range of frequencies, wherein the second communication signals are transmitted along the military standard 1553 bus at less than a predetermined decibel level, and wherein the second predefined range of frequencies and the predetermined decibel level are selected such that the military standard 1553 communication signals continue to satisfy a predetermined minimum signal to noise ratio while the second communication signals are transmitted,
   wherein the first predefined range of frequencies is centered about 1 MHz, and wherein the second predefined range of frequencies comprises 2 GHz to 4 GHz.

8. An assembly comprising:
   an aircraft;
   a military standard 1553 bus comprising at least two conductors extending though at least a portion of the aircraft;
   a military standard 1553 node carried by the aircraft and configured to communicate via the military standard 1553 bus with military standard 1553 communication signals at a first predefined range of frequencies;
   a first pair of interface nodes carried by the aircraft and configured to communicate via the military standard 1553 bus with second communication signals having a second predefined range of frequencies, different than the first predefined range of frequencies, wherein the second communication signals are transmitted along the military standard 1553 bus at less than a predetermined decibel level, and wherein the second predefined range of frequencies and the predetermined decibel level are selected such that the military standard 1553 communication signals continue to satisfy a predetermined minimum signal to noise ratio while the second communication signals are transmitted; and
   a second pair of interface nodes carried by the aircraft and comprising third and fourth interface nodes configured to communicate via the military standard 1553 bus with third communication signals having a third predefined range of frequencies, different than both the first predefined range of frequencies and the second range of frequencies, wherein the third communication signals are transmitted along the military standard 1553 bus at less than the predetermined decibel level, and wherein the third predefined range of frequencies and the predetermined decibel level are selected such that the military standard 1553 communication signals continue to satisfy the predetermined minimum signal to noise ratio while the third communication signals are transmitted.

9. The assembly of claim 8 wherein the military standard 1553 communication signals are transmitted in accordance with a military standard 1553 communication protocol, and wherein the second communication signals are transmitted in accordance with a predefined communication protocol, different than the military standard 1553 communication protocol.

10. The assembly of claim 8 wherein the first predefined range of frequencies is centered about 1 MHz, and wherein the second predefined range of frequencies comprises 2 MHz to 45 MHz.

11. An assembly comprising:
    an aircraft;
    a military standard 1553 bus comprising at least two conductors extending though at least a portion of the aircraft;
    a military standard 1553 node carried by the aircraft and configured to communicate via the military standard 1553 bus with military standard 1553 communication signals at a first predefined range of frequencies; and
    a first pair of interface nodes carried by the aircraft and configured to communicate via the military standard 1553 bus with second communication signals having a second predefined range of frequencies, different than the first predefined range of frequencies, wherein the second communication signals are transmitted along the military standard 1553 bus at less than a predetermined decibel level, and wherein the second predefined range of frequencies and the predetermined decibel level are selected such that the military standard 1553 communication signals continue to satisfy a predetermined minimum signal to noise ratio while the second communication signals are transmitted, wherein the first predefined range of frequencies is centered about 1 MHz, and wherein the second predefined range of frequencies comprises 200 MHz to 400 MHz.

12. An assembly comprising:
an aircraft;
a military standard 1553 bus comprising at least two conductors extending though at least a portion of the aircraft;
a military standard 1553 node carried by the aircraft and configured to communicate via the military standard 1553 bus with military standard 1553 communication signals at a first predefined range of frequencies; and
a first pair of interface nodes carried by the aircraft and configured to communicate via the military standard 1553 bus with second communication signals having a second predefined range of frequencies, different than the first predefined range of frequencies, wherein the second communication signals are transmitted along the military standard 1553 bus at less than a predetermined decibel level, and wherein the second predefined range of frequencies and the predetermined decibel level are selected such that the military standard 1553 communication signals continue to satisfy a predetermined minimum signal to noise ratio while the second communication signals are transmitted,
wherein the first predefined range of frequencies is centered about 1 MHz, and wherein the second predefined range of frequencies comprises 2 GHz to 4 GHz.

13. A communications method comprising:
providing a military standard 1553 bus comprising at least two conductors;
communicating via the military standard 1553 bus with military standard 1553 communication signals at a first predefined range of frequencies;
communicating via the military standard 1553 bus with second communication signals having a second predefined range of frequencies, different than the first predefined range of frequencies, wherein the second communication signals are transmitted along the military standard 1553 bus at less than a predetermined decibel level, and wherein the second predefined range of frequencies and the predetermined decibel level are selected such that the military standard 1553 communication signals continue to satisfy a predetermined minimum signal to noise ratio while the second communication signals are transmitted; and
communicating via the military standard 1553 bus with third communication signals having a third predefined range of frequencies, different than both the first predefined range of frequencies and the second predefined range of frequencies, wherein the third communication signals are transmitted along the military standard 1553 bus at less than the predetermined decibel level, and wherein the third predefined range of frequencies and the predetermined decibel level are selected such that the military standard 1553 communication signals continue to satisfy the predetermined minimum signal to noise ratio while the third communication signals are transmitted.

14. The method of claim 13 wherein communicating via the military standard 1553 bus with military standard 1553 communication signals comprises communicating in accordance with a military standard 1553 communication protocol, and wherein communicating via the military standard 1553 bus with second communication signals comprises communicating in accordance with a predefined communication protocol, different than the military standard 1553 communication protocol.

15. The method of claim 13 wherein the first predefined range of frequencies is centered about 1 MHz, and wherein the second predefined range of frequencies comprises 2 MHz to 45 MHz.

16. A communications method comprising:
providing a military standard 1553 bus comprising at least two conductors;
communicating via the military standard 1553 bus with military standard 1553 communication signals at a first predefined range of frequencies; and
communicating via the military standard 1553 bus with second communication signals having a second predefined range of frequencies, different than the first predefined range of frequencies, wherein the second communication signals are transmitted along the military standard 1553 bus at less than a predetermined decibel level, and wherein the second predefined range of frequencies and the predetermined decibel level are selected such that the military standard 1553 communication signals continue to satisfy a predetermined minimum signal to noise ratio while the second communication signals are transmitted,
wherein the first predefined range of frequencies is centered about 1 MHz, and wherein the second predefined range of frequencies comprises 200 MHz to 400 MHz.

17. A communications method comprising:
providing a military standard 1553 bus comprising at least two conductors;
communicating via the military standard 1553 bus with military standard 1553 communication signals at a first predefined range of frequencies; and
communicating via the military standard 1553 bus with second communication signals having a second predefined range of frequencies, different than the first predefined range of frequencies, wherein the second communication signals are transmitted along the military standard 1553 bus at less than a predetermined decibel level, and wherein the second predefined range of frequencies and the predetermined decibel level are selected such that the military standard 1553 communication signals continue to satisfy a predetermined minimum signal to noise ratio while the second communication signals are transmitted,
wherein the first predefined range of frequencies is centered about 1 MHz, and wherein the second predefined range of frequencies comprises 2 GHz to 4 GHz.

* * * * *